US008644297B2

(12) United States Patent
Lee

(10) Patent No.: US 8,644,297 B2
(45) Date of Patent: Feb. 4, 2014

(54) COMMUNICATING DEVICE AND METHOD OF PEER TO PEER COMMUNICATION BETWEEN VOIP DEVICES

(75) Inventor: Chih-Fang Lee, Hsinchu (TW)

(73) Assignee: Arcadyan Technology Corporation, Hsinchu (TW)

( * ) Notice: Subject to any disclaimer, the term of this patent is extended or adjusted under 35 U.S.C. 154(b) by 1817 days.

(21) Appl. No.: 11/685,943

(22) Filed: Mar. 14, 2007

(65) Prior Publication Data

US 2007/0217595 A1 Sep. 20, 2007

(30) Foreign Application Priority Data

Mar. 20, 2006 (TW) .................................. 95109474 A

(51) Int. Cl.
*H04L 12/66* (2006.01)
*H04M 7/00* (2006.01)

(52) U.S. Cl.
USPC ................. 370/352; 379/221.01; 379/221.02

(58) Field of Classification Search
USPC .......................... 370/352; 379/221.01, 221.02
See application file for complete search history.

(56) References Cited

U.S. PATENT DOCUMENTS

| | | | | |
|---|---|---|---|---|
| 6,917,610 | B1 * | 7/2005 | Kung et al. | 370/352 |
| 2003/0225912 | A1 * | 12/2003 | Takeda et al. | 709/246 |
| 2006/0104432 | A1 * | 5/2006 | Evslin | 379/220.01 |
| 2007/0071221 | A1 * | 3/2007 | Allen et al. | 379/265.01 |

* cited by examiner

*Primary Examiner* — Nicholas Jensen
(74) *Attorney, Agent, or Firm* — Kusner & Jaffe

(57) ABSTRACT

The present invention provides a communicating device and a method for peer to peer communication between voice over IP (VOIP) devices by means of transmitting IP address to remote site by Call ID method and establishing a data structure. The data structure stated above may record the Internet IP address corresponding to the outgoing and incoming VOIP phone number. When a user dials or receives the phone number recorded in the data structure, the communicating device with this data structure will find the Internet IP address corresponding to this VOIP phone number and using this IP address for peer to peer communication. It is unnecessary to register to SIP proxy or Call Agent which provided by service provider.

20 Claims, 4 Drawing Sheets

| | column 104 | column 106 | column 108 | column 110 | column 112 | column 114 |
|---|---|---|---|---|---|---|
| | phone number | IP address | outgoing | incoming | Communi--ation time | incoming signal |
| Record 1 | | | | | | |
| Record 2 | | | | | | |
| Record 3 | | | | | | | data structure 16

Fig. 2

COMMUNICATING DEVICE AND METHOD OF PEER TO PEER COMMUNICATION BETWEEN VOIP DEVICES

FIELD OF THE INVENTION

The present invention relates to a communicating device and a method for handling incoming and outgoing calls, and more particularly for peer to peer communication.

BACKGROUND OF THE INVENTION

As Internet becomes popular and applications on Internet grow rapidly, users can reach much more services than ever. Recently, communicating devices have become killing application among numerous Internet services; for example, among these devices, Voice over Internet Protocol (VOIP) is the one commonly known to the public. Many corporations endeavor to provide various services to attract consumers. Comparing with traditional communicating model, with existing mature internet infrastructure, VOIP can provide consumers cheap and integrated services and makes every VOIP service provider looks like a small telecommunication corporation.

When instant communication mainly applies to text messages which only need transmitting very few data, most service providers offer free charge service to consumers. VOIP is not the case. This technology needs transmitting more data and overlaps with many existing services provided by Telecommunication Corporation. For this reason, the idea that users have to pay is taking shape.

Because users still need to dial or receive the phone call through telephone exchange equipment provided by service providers, VOIP Providers still charge the consumers in traditional way; It means consumers have to pay extra fee, for example, fee for number registration, call access, call transfer, or VOIP call transfer among different internet service providers. Especially when a VOIP call transfer and access is done through different internet service providers, users need to pay more for different providers; for example, fee for service provider connected by callers, fee for service provider connected by receivers and fee for VOIP service provider. Eventually, it is users have to shoulder the fee.

Regarding to the questions we mentioned above, we develop a new method to reduce the unnecessary expense.

SUMMARY OF THE INVENTION

The present invention provides a communicating device for peer to peer communication, and the present invention comprises a controller; a Foreign Exchange Station (FXS) coupled to a controller to provide communication, a Foreign Exchange Office (FXO) coupled to a controller to connect to a Public Switch Telephone Network (PSTN) or an Integrated Service Digital Network (ISDN). An Ethernet port is coupled to a controller to connect to an Ethernet or a broadband interface, for example, ADSL, VDSL, GPON, EPON, FTTH, WiMAX. A signal transmitting module is coupled to a controller and a data structure stored in memory of a communicating device is coupled to a controller to store information relating to incoming calls and outgoing calls.

When an incoming call exists, a controller connects to a FXS or a FXO. By records stored in a data structure, a controller can further determine if the information of an incoming call or a outgoing call exists in the data structure. The data structure comprises a phone number column, an IP address column and an incoming call column.

The incoming call column of the data structure is for recording a signal stream of the device's IP address of an incoming call, the phone number column is used for recording the phone number of an incoming call and the IP address column is employed for recording the device's IP address of an incoming call.

If the controller mentioned above determines that the phone number of an outgoing call does not exist in the data structure, when dialing the phone call, the signal transmitting module would transmit a signal stream with the communicating device's IP address to the incoming signal column of the destined device of the outgoing call, simultaneously.

If the phone number of an outgoing call exists in the data structure, then the controller finds the IP address corresponding to the phone number. By doing so, the controller can establishes peer to peer communication by this IP address, and then records relating information in the columns of the data structure.

If an incoming call comes with a signal stream containing the device's IP address of an incoming call, the controller transforms the a signal stream to the device's IP address of an incoming call, and then records the information in the corresponding the columns of data structure respectively.

The data structure also has an outgoing column to record how many times a phone number stored in this data structure has been dialed; an incoming column to record how many times a phone number stored in this data structure has been received; a communication time column to record the communication time of a phone number stored in this data structure.

If the volume of data structure reaches its capacity limit, the controller can sort the outgoing column, the incoming column and the communication time column in order of usage frequency to select the data storing in data structure.

One advantage of the present invention is to provide a peer to peer communicating device and a method of processing incoming and outgoing calls, wherein the device and method can be used in quiet the same way as a traditional one, so that users can use it easily.

Another advantage of the present invention is to provide a peer to peer communicating device and a processing method for handling incoming and outgoing calls, wherein the device and method can record the IP address of incoming calls and outgoing calls, and then establish peer to peer connection by this IP address. By this way, fee for call transfer among different net can be avoided.

Yet another advantage of the present invention is providing a data structure stored in memory of a communicating device to record information relating to incoming and outgoing calls, wherein if the volume of data structure reaches its capacity limit, the controller can sort the columns of data structure in order of usage frequency to select the data storing in data structure.

BRIEF DESCRIPTION OF THE DRAWINGS

FIG. 2 shows a schematic diagram of a data structure device according to the present invention.

DETAILED DESCRIPTION OF THE PREFERRED EMBODIMENT

The invention will now be described in greater detail with preferred embodiments of the invention and illustrations attached. Nevertheless, it should be recognized that the preferred embodiments of the invention is only for illustrating. Besides the preferred embodiment mentioned here, present invention can be practiced in a wide range of other embodiments besides those explicitly described, and the scope of the present invention is expressly not limited expect as specified in the accompanying claims.

Figure 1:
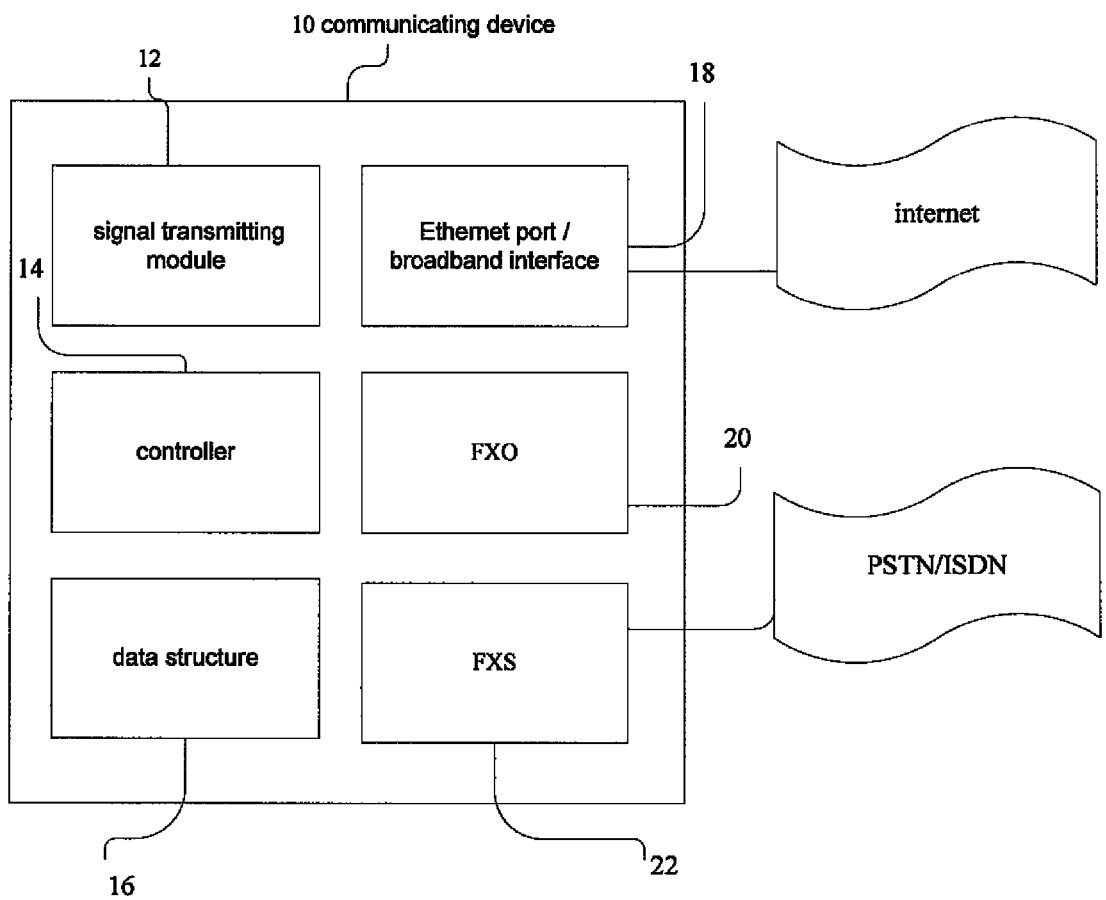
FIG. 1 shows a communicating device according to the present invention.

FIG. 1 shows the preferred embodiment of a communicating device 10 of the present invention. A communicating device 10 comprises a signal transmitting module 12, a controller 14, a data structure 16, an Ethernet port or a broadband interface 18, a FXO 20, and a FXS 22.

The controller 14 couples with a FXS 22 to connect to a central office (CO) to provide communication, and the controller 14 also couples with a FXO 20 to connect to a PSTN or an ISDN. As shown in the illustration, the controller 14 is coupled with an Ethernet port or a broadband interface 18 to connect to internet, for example, ADSL, VDSL, GPON, EPON, FTTH, WiMAX. The controller 14 couples with a Data structure 16 stored in memory of a communicating device 10 to store information relating to incoming and outgoing calls as reference. The controller 14 can determine if an incoming or an outgoing call exists in the data structure 16 by the reference mentioned above. The data structure 16 can also store the number of times of the call incoming, outgoing and communication time of this call. With the data structure 16, the controller 14 couples with the signal transmitting module 12 to provide peer to peer communication.

When a communicating device 10 receives a signal from the device of an incoming call, according to the situation, the controller 14 connects to a FXS 22, a FXO 20, or an Ethernet port or a broadband interface 18 to receive the signal from the device of the incoming call transmitting by a PSTN, ISDN, CO or internet.

FIG. 2 shows the schematic diagram of a data structure 16. The data structure 16 comprises a phone number column 104, an IP address column 106, an outgoing column 108, an incoming column 110, a communication time column 112, and an incoming signal column 114. The phone number column 104 is used to record the phone number of incoming and outgoing calls. The IP address column 106 is used to record the communicating device's IP address of an incoming call or the destined device's IP address of an outgoing call. The outgoing column 108 is employed to calculate how many times the phone number stored in data structure 16 has been dialed; the incoming column 110 is used to calculate that how many times the incoming phone number stored in the data structure 16 has been received; the communication time column 112 is utilized to calculate the communication time of the phone number stored in this data structure. The incoming signal column 114 is used to record a signal stream containing the device's IP address of an incoming call.

With the controller 14 and the data stored in the phone number column 104, the data structure 16 can determine and store the information relating to incoming calls and outgoing calls.

When a user dials a call by a communicating device 10, if the controller 14 determines that the phone number does not exist in the data structure 16, i.e. the controller 14 determines the phone number does not exist in the phone number column 104, a normal telephone communication is established. According to the information of the destined device recorded in the incoming signal column 114, a Signal transmitting module 12 transmits signal stream containing communicating device's 10 IP address to the destined device of the outgoing call. A normal telephone communication mentioned above is established by connecting to a FXS 22 or a FXO 20.

A signal from the device of an incoming call that communicating device 10 receives is a signal stream which can be identified by a communicating device 10. A signal stream with the device's IP address of an incoming call records in incoming signal 114, and then the controller 14 can transform the signal stream to the device's IP address of the incoming call. Then the controller 14 records the IP address in the IP address column 106 and other information in the phone number column 104, the incoming column 110, and the communication time column 112 respectively. If a user uses a communicating device 10 to dial a phone number recording in the data structure 16 again, the controller 14 will search the corresponding IP address in the data structure 16 to establish peer to peer communication. As shown in FIG. 1, peer to peer VOIP connection is established via the route established between an Ethernet port or the broadband interface 18 and the Internet.

If a user uses the communicating device 10 to dial the number recorded in the data structure 16 again, the controller 14 will search the corresponding IP address in the data structure 16, and then use this IP address for peer to peer communication.

If the volume of data structure 16 reaches its capacity limitation, the controller 14 can sort the outgoing column 108, the incoming column 110 and the communication time column 112 in order of usage frequency to select the data storing in data structure.

Figure 3:
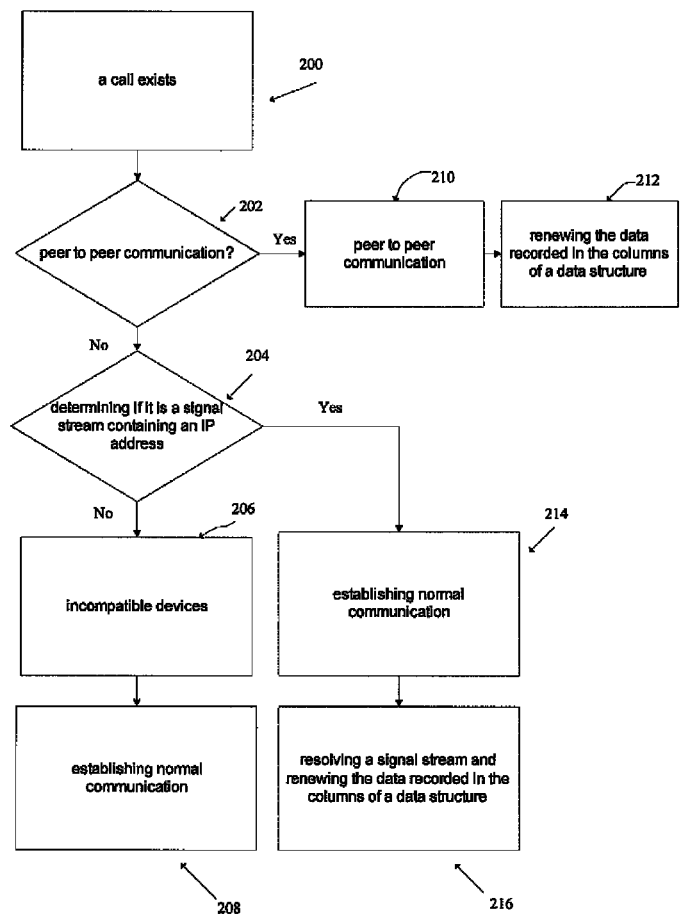
FIG. 3 shows a schematic diagram of a method for handling an incoming call device according to the present invention.
Figure 4:
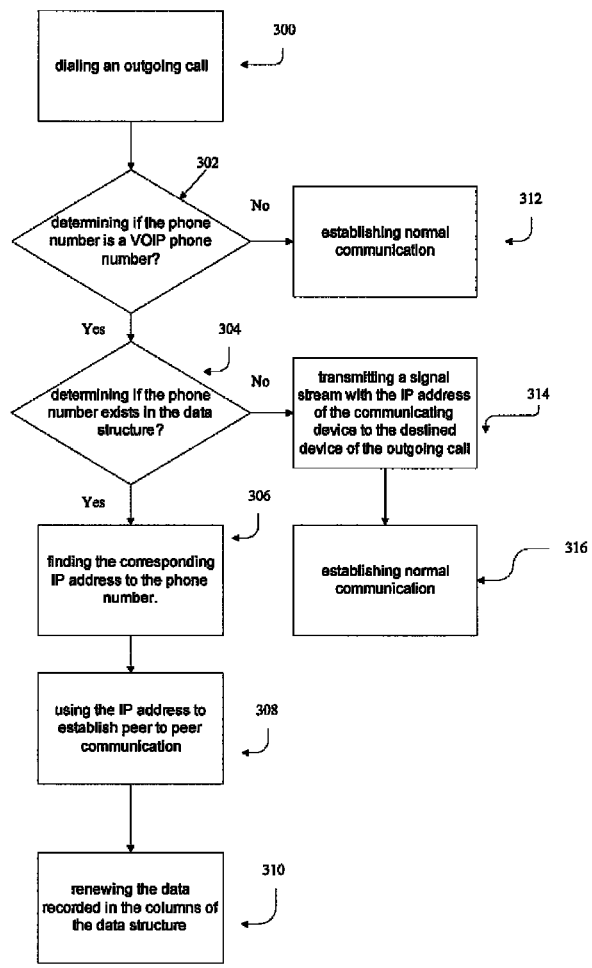
FIG. 4 shows a schematic diagram of a method for handling an outgoing call device according to the present invention.

FIG. 3 and FIG. 4 illustrate a method for a communicating device of the present invention for processing incoming or outgoing calls of peer to peer communication respectively. FIG. 3 illustrates the schematic diagram for a communicating device receiving an incoming call; FIG. 4 illustrates the schematic diagram of a communicating device dialing a phone call.

FIG. 3 illustrates a processing method for a communicating device of the present invention for handling an incoming signal coming from the device of an incoming call. In step 200, it receives an incoming call, and followed by determining whether or not the incoming call is peer to peer communication in step 202. Typically, the handling method for peer to peer communication includes a step to determine the connection scheme between a device of an incoming call and the communicating device. If the determination is positive, then the next step flows to step 210 to establish peer to peer communication; if it is negative, the step flows to step 204. As shown in FIG. 1, whether connection between a communicating device 10 and a device of incoming call is peer to peer connection is determined by whether communication is established via a route established between an Ethernet port or a broadband interface 18 and internet. As shown in step 210, if an incoming call is peer to peer communication, then peer to peer communication is established between the device of an incoming call and the communicating device 10. Then Step 212 renews the corresponding data recorded in the columns of the data structure 16, for example, renewing the frequency of incoming calls recorded in incoming column 110, renewing communication time between the incoming device and communicating device 10 recorded in the communication time column 112.

In step 204, the controller may determine whether or not an incoming call comes with signal stream containing an IP address. If it is, then the step flows to step 214 to establish normal telephone communication; conversely, then the step flows to step 206. As shown in FIG. 1, the controller 14 is responsible to determine if an incoming call comes with a signal stream containing an IP address.

The incompatible communicating device in step 206 means that step 204 determines an incoming call is not a signal stream containing an IP address, so the device of the incoming call is not compatible with the communicating device 10 to establish peer to peer communication between them. In this situation, the step flows to step 206 to establish normal telephone communication, i.e. non peer to peer telephone communication.

As shown in step 214, although step 204 determines an incoming call is a signal stream containing an IP address, and peer to peer communication can be established between the device of an incoming call and a communicating device 10, without the record of the IP address of an incoming call and the communication device's 10 IP address existing in the device, only non peer to peer telephone communication can be established. In next step, Step 216 resolves the signal stream by the controller 14 and then transforms it to IP address of the incoming call. In the same step, step 216 then records the IP address in the IP address column 106, phone number of the incoming call in the phone number column 104, and other information in the corresponding column of the data structure 16 respectively, for example, renewing the frequency of the incoming call recorded in the incoming column 110, renewing communication time between the incoming device and the communicating device 10 recorded in the communication time column 112.

A normal telephone communication described in Step 208 and step 214 is a procedure establishing a communication by connecting to a PSTN, ISDN, CO.

When renewing the data recorded in columns of the data structure in step 212 or 216, if the volume of data structure 16 reaches its limit, the controller can sort the incoming column and the communication time column in order of usage frequency to select the data storing in data structure.

As shown in FIG. 4, The present invention provides a method for a communicating device of the present invention for handling dialing a phone call to a destined device of the outgoing call. Step 300 dials a phone call, i.e. dialing a phone call by communicating device 10 to the destined device. In subsequent Step 302, the device determines if the outgoing call is a VOIP call. If the determination is positive, step 304 determines if the phone number of the outgoing call has been recorded in the communicating device, i.e. determines if the phone number exists in the data structure 16. On the contrary, the step flows to step 312. By the IP address, the certificate or other characters of a destined device, we can determine if the outgoing call is a VOIP call. As shown in step 312, if the outgoing call is not a VOIP call, a normal telephone communication is established. FIG. 1 is the schematic diagram of a procedure using a FXS 22, a FXO 20 to connect to a PSTN, ISDN, or CO to establish communication.

As shown in step 304, if step 302 determines an outgoing call is a VOIP call, then determines if the phone number exists in phone number column 104. If it is, the step flows to step 306 to find the IP address corresponding to the outgoing phone number. If it is not, the step flows to step 314. When dialing a phone call by a communicating device of the present invention, the communicating device needs the IP address of a destined device to establish peer to peer connection between the communicating device and a destined device without using call transfer services or call access services provided by service providers.

As shown in step 314, If step 304 determines the phone number of the a outgoing call does not exist in the phone number column 104, the communicating device transmit signal stream with an IP address of communicating device 10, and then the step 316 establishes a normal phone call.

As shown in step 306, if the device in step 304 determines that the phone number of a outgoing call exists in phone number column 104, finding the corresponding IP address, i.e. comparing the phone number of the outgoing call and the phone number recorded in column 104, and then the IP address recorded in column 106 corresponding to the phone number can be found. In the following step 308 the device can use the IP address to establish a peer to peer phone call, and then, in step 310, renews data recorded in the columns of the data structure 16 corresponding to the phone number respectively, for example, increasing the frequency of incoming calls recorded in incoming column 110, renewing the communication time between the incoming device and the communicating device 10 recorded in the communication time column 112.

When step 310 renews data recorded in the columns of the data structure respectively, if the volume of data structure 16 reaches its capacity limit, the controller 114 can sort the incoming column and the communication time column in order of usage frequency to select the data storing in data structure.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

Having described the invention, the following is claimed:

1. A communicating device for peer to peer communication, comprising:
   a controller;
   a Foreign Exchange Station (FXS) coupled to said controller to provide communication;
   a Foreign Exchange Office (FXO) coupled to said controller to connect to a Public Switch Telephone Network (PSTN) or an Integrated Service Digital Network (ISDN);
   an Ethernet port or a broadband interface coupled to said controller to connect to internet;
   a signal transmitting module coupled to said controller;
   a data structure stored in a memory of said communicating device coupled to said controller to store information relating to incoming calls and outgoing calls, wherein said communicating device is a device for dialing said outgoing calls and receiving said incoming calls, and said information relating to said incoming calls and said outgoing calls stored in said data structure are references by which said controller determines if a new incoming call or a new outgoing call exists in said data structure, said data structure comprises:
      a phone number column used to record the phone number of said incoming calls and the phone number of said outgoing calls, wherein said references are recorded in the phone number column,
      an Internet Protocol (IP) address column used to record said communicating device's IP address of said incoming calls,
      an outgoing column to record how many times a phone number has been dialed,
      an incoming column to record how many times a phone number stored in the data structure has been received,
      a communication time column to record the newest communication time between said communicating device and a communicating device of said incoming or outgoing calls; and
   wherein, if volume of said data structure reaches a capacity limit, said controller sorts said outgoing column, said incoming column and said communication time column in order of usage frequency to select the data stored in said data structure, if said controller determines that said phone number of said new outgoing call exists in the phone number column, then said controller finds the corresponding IP address by comparing the phone number of the new outgoing call and the phone number recorded in the phone number column, said IP address recorded in the IP address column corresponding to the phone number is used to establish a peer to peer connection without using call transfer services or call access services provided by service providers, and if said controller determines that said phone number of said new outgoing call does not exist in the phone number column, then said controller establishes a connection using said call transfer services or said call access services provided by said service providers.

2. The communicating device of claim 1, wherein if said controller determines that said phone number of said new outgoing call does not exist in the phone number column, then said signal transmitting module transmits a signal stream to a destined device of said new outgoing call.

3. The communicating device of claim 2, wherein said signal stream contains said communicating device's IP address.

4. A handling method of an incoming call for a communicating device for peer to peer communication, wherein the communicating device includes:
(a) a controller;
(b) a Foreign Exchange Station (FXS) coupled to said controller to provide communication;
(c) a Foreign Exchange Office (FXO) coupled to said controller to connect to a Public Switch Telephone Network (PSTN) or an Integrated Service Digital Network (ISDN);
(d) an Ethernet port or a broadband interface coupled to said controller to connect to internet;
(e) a signal transmitting module coupled to said controller; a data structure stored in a memory of said communicating device coupled to said controller to store information relating to incoming calls and outgoing calls, wherein said communicating device is a device for dialing said outgoing calls and receiving said incoming calls, and said information relating to said incoming calls and said outgoing calls stored in said data structure are references by which said controller determines if a new incoming call or a new outgoing call exists in said data structure, said data structure including:
a phone number column used to record the phone number of said incoming calls and the phone number of said outgoing calls, wherein said references are recorded in the phone number column,
an Internet Protocol (IP) address column used to record said communicating device's IP address of said incoming calls,
an outgoing column to record how many times a phone number has been dialed,
an incoming column to record how many times a phone number stored in the data structure has been received,
a communication time column to record the newest communication time between said communicating device and a communicating device of said incoming or outgoing calls, wherein the handling method of said incoming call comprises the steps of:
determining a connection scheme between a device of said incoming call and said communicating device, wherein
(a) if said connection scheme is peer to peer communication, then establishing connection with peer to peer communication, and
(b) if said connection scheme is not determined to be peer to peer communication, then checking a signal stream of the incoming signal, wherein
(i) if said signal stream does contains an IP address, then establishing a non-peer to peer telephone communication, resolving the signal stream, and recording said IP address corresponding to a phone number of said incoming call in said communicating device; and
(ii) if said signal stream does not contain an IP address, then establishing a non-peer to peer telephone communication; and
wherein, if volume of said data structure reaches a capacity limit, sorting one or more of said outgoing column, said incoming column and said communication time column in order of usage frequency to select the data stored in said data structure.

5. The method for handling the incoming call of claim 4, further comprising a step for renewing data recorded in the columns of said data structure of said communicating device by recording number of times of the incoming call in the incoming column of said data structure.

6. The method for handling the incoming call of claim 5, wherein said step for renewing data includes recording newest communication time between the device of the incoming call and the communicating device in the communication time column.

7. The method for handling the incoming call of claim 5, wherein said step for renewing data comprises that if the volume of data structure reaches its capacity limit, a controller sorts said incoming column and said communication time column in order of usage frequency to select data storing in said data structure.

8. The method for handling the incoming call of claim 5, wherein said step for resolving the signal stream further comprises a step for renewing data recorded in the columns of said data structure of said communicating device by recording the phone number of said incoming call in the phone number column of said data structure.

9. The method for handling the incoming call of claim 8, wherein said step for renewing data comprises recording the number of times of the call incoming in the incoming column of said data structure.

10. The method for handling the incoming call of claim 8, wherein said step for renewing data comprises recording newest communication time between said device of said incoming call and said communicating device in the communication time column of said data structure.

11. The method for handling the incoming call of claim 8, wherein said step for renewing data comprises that if the volume of data structure reaches its capacity limit, the controller can sort the incoming column and the communication time column in order of usage frequency to select the data storing in said data structure.

12. The method for handling the incoming call of claim 4, wherein said step of establishing connection with peer to peer communication comprises establishing communication by connecting to a PUBLIC SWITCH TELEPHONE NETWORK, INTEGRATED SERVICE DIGITAL NETWORK, or CENTRAL OFFICE.

13. A handling method for an outgoing call for a communicating device for peer to peer communication, wherein the communicating device includes:
(a) a controller;
(b) a Foreign Exchange Station (FXS) coupled to said controller to provide communication;
(c) a Foreign Exchange Office (FXO) coupled to said controller to connect to a Public Switch Telephone Network (PSTN) or an Integrated Service Digital Network (ISDN);
(d) an Ethernet port or a broadband interface coupled to said controller to connect to internet;
(e) a signal transmitting module coupled to said controller; a data structure stored in a memory of said communicating device coupled to said controller to store information relating to incoming calls and outgoing calls, wherein said communicating device is a device for dialing said outgoing calls and receiving said incoming calls, and said information relating to said incoming calls and said outgoing calls stored in said data structure are references by which said controller determines if a new incoming call or a new outgoing call exists in said data structure, said data structure including:
a phone number column used to record the phone number of said incoming calls and the phone number of said outgoing calls, wherein said references are recorded in the phone number column,
an Internet Protocol (IP) address column used to record said communicating device's IP address of said incoming calls,
an outgoing column to record how many times a phone number has been dialed,
an incoming column to record how many times a phone number stored in the data structure has been received,
a communication time column to record the newest communication time between said communicating device and a communicating device of said incoming or outgoing calls,
wherein the handling method of said outgoing call comprises the steps of:
determining a connection scheme between a device of an outgoing call and said communicating device, wherein
(a) if said connection scheme is determined not to be a Voice Over IP (VOIP) connection, then establishing non-peer to peer telephone communication; and
(b) if said connection scheme is determined to be a Voice Over IP (VOIP) connection, then determining if a phone number exists in the communicating device, wherein
(i) if it is determined that a phone number does not exist in the communicating device, then transmitting a signal stream to a destined device of said outgoing call and establishing non-peer to peer telephone communication; and
(ii) if it is determined that a phone number does exist in the communicating device, then finding an IP address corresponding to the phone number of said outgoing call according to the IP address and the phone number recorded in said communicating device in a former communication; and then establishing peer to peer communication with the destined device; and
wherein, if volume of said data structure reaches a capacity limit, sorting one or more of said outgoing column, said incoming column and said communication time column in order of usage frequency to select the data stored in said data structure.

14. The method for handling the outgoing call of claim 13, wherein said step for establishing peer to peer communication further comprises renewing data recorded in the columns of said data structure of said communicating device by recording a number of times of the outgoing call in the outgoing column of said data structure.

15. The method for handling the outgoing call of claim 14, wherein said step for renewing data recorded in the columns of said data structure is recording newest communication time between said devices of said incoming call and said communicating device in the communication time column of said data structure.

16. The method for handling the outgoing call of claim 13, wherein said step for determining said outgoing call is to determine if the destined device of said outgoing call has an IP address.

17. The method for handling the outgoing call of claim 13, wherein said step for determining if the phone number exists in the communicating device is to compare the phone number of said outgoing call with phone numbers stored in the communicating device.

18. The method for handling the outgoing call of claim 13, wherein said step for transmitting a signal stream to said destined device is transmitting signal stream containing the communicating device's IP address of said outgoing call.

19. The method for handling the outgoing call of claim 13, wherein said step for establishing non-peer to peer telephone communication comprises establishing communication by connecting to a PUBLIC SWITCH TELEPHONE NETWORK, INTEGRATED SERVICE DIGITAL NETWORK, or CENTRAL OFFICE.

20. The method for handling the outgoing call of claim 14, wherein said step for renewing the columns of a data structure comprises that if the volume of said data structure reaches its capacity limit, the controller can sort the incoming column and the communication time column in order of usage frequency to select the data stored in said data structure.

* * * * *